US012200039B2

(12) United States Patent
Chien et al.

(10) Patent No.: US 12,200,039 B2
(45) Date of Patent: Jan. 14, 2025

(54) HTTP-BASED MESSAGE BROKER ARCHITECTURES FOR COMMUNICATIONS BETWEEN A CLOUD-BASED CONTROLLER AND NETWORK DEVICES OF A WIRELESS COMMUNICATIONS NETWORK AND RELATED METHODS

(71) Applicant: Ruckus IP Holdings LLC, Claremont, NC (US)

(72) Inventors: Cheng-Ming Chien, New Taipei (TW); Wei-Sheng Hsu, San Jose, CA (US); I-Cheng Liang, Kaohsiung (TW)

(73) Assignee: Ruckus IP Holdings LLC, Claremont, NC (US)

( * ) Notice: Subject to any disclaimer, the term of this patent is extended or adjusted under 35 U.S.C. 154(b) by 0 days.

(21) Appl. No.: 18/364,139

(22) Filed: Aug. 2, 2023

(65) Prior Publication Data
US 2024/0048609 A1 Feb. 8, 2024

Related U.S. Application Data (60) Provisional application No. 63/394,649, filed on Aug. 3, 2022.

(51) Int. Cl.
*H04L 67/02* (2022.01)
*G06F 9/54* (2006.01)
*H04L 67/10* (2022.01)

(52) U.S. Cl.
CPC ............. *H04L 67/02* (2013.01); *G06F 9/547* (2013.01); *H04L 67/10* (2013.01)

(58) Field of Classification Search
CPC .......... G06F 9/547; H04L 67/02; H04L 67/10
See application file for complete search history.

(56) References Cited

U.S. PATENT DOCUMENTS

| | | | | |
|---|---|---|---|---|
| 10,079,865 | B2 * | 9/2018 | McDaid | H04L 67/288 |
| 11,005,773 | B2 * | 5/2021 | Parker | H04L 67/51 |
| 11,212,368 | B2 * | 12/2021 | Girbal | H04L 69/08 |
| 11,228,656 | B1 * | 1/2022 | Celestine | G06F 9/542 |
| 11,558,466 | B1 * | 1/2023 | Shekhar | H04L 67/02 |
| 11,558,477 | B1 * | 1/2023 | S | H04L 12/1854 |
| 11,917,031 | B2 * | 2/2024 | Prasad | H04L 67/562 |
| 11,922,235 | B2 * | 3/2024 | Iyer | G06F 9/546 |
| 2010/0185840 | A1 * | 7/2010 | Duffy | G06F 9/4488 712/E9.06 |
| 2020/0257579 | A1 * | 8/2020 | Shekhar | H04L 45/306 |
| 2022/0191234 | A1 * | 6/2022 | Fox | G06N 20/00 |
| 2022/0321491 | A1 * | 10/2022 | Balle | H04L 67/133 |
| 2022/0394034 | A1 * | 12/2022 | Keith | G06F 9/547 |
| 2023/0344894 | A1 * | 10/2023 | Balle | H04L 67/02 |
| 2023/0389091 | A1 * | 11/2023 | He | H04W 76/12 |
| 2023/0403340 | A1 * | 12/2023 | Coviello | H04L 67/55 |
| 2024/0048476 | A1 * | 2/2024 | Adeel | H04L 45/02 |

\* cited by examiner

*Primary Examiner* — George C Neurauter, Jr.
(74) *Attorney, Agent, or Firm* — Myers Bigel, P.A.

(57) ABSTRACT

An application of a cloud-based controller forwards a message to a message broker of the cloud-based controller. The message is then transmitted to a network device of a wireless communications network over a persistent hypertext transfer protocol ("HTTP") connection. Thereafter, an acknowledgment is received in response to transmitting the message at a gRPC proxy for the message broker.

13 Claims, 7 Drawing Sheets

FIG. 7

HTTP-BASED MESSAGE BROKER ARCHITECTURES FOR COMMUNICATIONS BETWEEN A CLOUD-BASED CONTROLLER AND NETWORK DEVICES OF A WIRELESS COMMUNICATIONS NETWORK AND RELATED METHODS

RELATED APPLICATION

The present application claims priority from and the benefit of U.S. Provisional Patent Application No. 63/394,649, filed Aug. 3, 2022, the disclosure of which is hereby incorporated herein by reference in full.

BACKGROUND OF THE INVENTION

The present invention generally relates to wireless local area networks and, more particularly, to communications between a cloud-based controller and network devices of a wireless local area network.

A wireless local area network ("WLAN") refers to a network that operates in a limited area (e.g., within a home, school, store, campus, shopping mall, etc.) that interconnects two or more electronic devices using wireless radio frequency ("RF") communications. Electronic devices belonging to users ("clients") of a WLAN, such as smartphones, computers, tablets, printers, appliances, televisions, lab equipment and the like (herein "client devices"), can communicate with each other and with external networks such as the Internet over the WLAN. Since wireless communications are used, portable client devices such as smartphones, laptop computers and the like can be moved throughout the area covered by the WLAN and remain connected to the network. Most WLANs operate under a family of standards promulgated by the Institute of Electrical and Electronics Engineers (IEEE) that are referred to as the IEEE 802.11 standards. WLANs operating under the IEEE 802.11 family of standards are commonly referred to as WiFi networks. Client devices that include a networking subsystem that includes a WiFi network interface can communicate over WiFi networks.

A WiFi network includes one or more access points that are typically installed at fixed locations throughout the area covered by the WiFi network. The WiFi network can include a single access point that provides coverage in a very limited area or may include tens, hundreds or thousands of access points that provide in-building and/or outdoor coverage to a large campus or region. Client devices communicate with each other and/or with wired devices that are connected to the WiFi network through the access points. The access points may be connected to each other and/or to other network devices through wireless and/or wired connections. For example, at least some, and often all, of the access points are connected via wired connections to the ports on one or more network switches. A WiFi network typically includes one or more gateways that may be used to provide Internet access to the client devices and/or access to other external networks.

Most enterprise WiFi networks include a controller that manages communication between network devices (e.g., access points, switches, routers, data planes, etc.) and otherwise controls operation of the WiFi network. The controller may, for example, provide configuration management, user authentication, event/alarms reports, generate statistics and/or monitor/control various access point functions. Most early WiFi networks were controlled by an "on-premise" controller that was installed within (or near) the coverage area of the WiFi network. The on-premise controller could be, for example, a stand-alone controller or an access point that had control capabilities. The controller could be connected to the other network devices of the WiFi network via wired and/or wireless connections.

In recent years, the use of cloud-based controllers has proliferated. Controlling a WiFi network using a cloud-based controller has a number of advantages. For example, cloud-based controllers can readily be designed to have redundancy, and may be designed to be highly scalable. Cloud-based controllers may also be easier to maintain and update, and may provide significant economies of scale. The use of cloud-based controllers, however, provide certain challenges. For example, in a WiFi network with an on-premise controller, the network devices and the on-premise controller are all on the same side of any firewalls (e.g., a customer firewall), and hence there is no need to send control communications through a firewall. In contrast, firewalls will typically be interposed between a cloud-based controller and the network devices it manages. As another example, it may be challenging to ensure that communications capabilities between the cloud-based controller and the network devices of the WiFi network are readily scalable without necessitating that the network devices have expanded processing and/or memory capacity.

SUMMARY OF THE INVENTION

Pursuant to some embodiments of the present invention, methods for a cloud-based controller to communicate with a network device of a wireless communications network are provided in which a message from is forwarded an application of the cloud-based controller to a message broker. The message is then transmitted to the network device over a persistent hypertext transfer protocol ("HTTP") connection. An acknowledgment is received in response to transmitting the message at a gRPC proxy for the message broker.

In some embodiments, the method may further comprise forwarding the message to the gRPC proxy for the message broker prior to transmitting the message to the network device.

In some embodiments, the message broker is configured to receive additional messages from a plurality of different applications of the cloud-based controller. In some embodiments, the message and the additional messages are all routed to the network device through the persistent HTTP connection. In some embodiments, the message broker includes a plurality of queues, and the message and the additional messages are routed to queues of the message broker based on destination addresses of the message and the additional messages.

In some embodiments, the message is received at a gRPC agent of the network device.

In some embodiments, the message broker comprises a fire and forget message broker.

In some embodiments, the message is a first message from the application of the cloud-based controller, and the method may further comprise forwarding a second message from the application of the cloud-based controller to the message broker, transmitting the second message to the network device over the persistent HTTP connection, and receiving a second acknowledgment to the second message at an ingress controller of the cloud-based controller, the second acknowledgment including an address of the application. In some embodiments, the address of the application is a uniform resource locator ("URL"). In some embodiments, the second acknowledgment is not routed to the application through the message broker.

In some embodiments, the message broker includes a plurality of queues, and the message is stored in a first of the queues based on a destination address of the message.

In some embodiments, the wireless communications network is a WiFi network.

Pursuant to some embodiments of the present invention, methods for a network device of a wireless communications network to communicate with a cloud-based controller are provided in which a message is received from a message broker of the cloud-based controller. The message is forwarded to an application installed on the network device based on an address in the message. A callback URL is extracted from the message. An acknowledgment is forwarded to the message to the cloud-based controller.

In some embodiments, the acknowledgment is forwarded to an application running on the cloud-based controller that generated the message. In some embodiments, the acknowledgment is forwarded to the application running on the cloud-based controller via a path that does not include the message broker.

In some embodiments, the message is received over a persistent hypertext transfer protocol ("HTTP") connection established between the cloud-based controller and the network device. In some embodiments, the message is a first message that is generated by a first service of the cloud-based controller, the method further comprising receiving a second message from the message broker of the cloud-based controller that is generated by a second service of the cloud-based controller over the HTTP connection established between the cloud-based controller and the network device.

In some embodiments, the method may further comprise forwarding an acknowledgment to the second message to a gRPC proxy for the message broker of the cloud-based controller.

In some embodiments, the message is received at a gRPC agent.

In some embodiments, the method may further comprise forwarding the message to an embedded message broker of the network device. In some embodiments, the embedded message broker is a fire and forget message broker. In some embodiments, the embedded message broker includes a plurality of queues, and wherein the message is stored in a first of the queues based on a destination address of the message.

In some embodiments, the wireless communications network is a WiFi network.

Pursuant to further embodiments of the present invention, methods for a cloud-based controller to communicate with a network device of a wireless communications network are provided in which a message is forwarded from an application of the cloud-based controller to a message broker. The message is transmitted to the network device over a WebSocket tunnel. An acknowledgment is received in response to transmitting the message.

In some embodiments, the method may further comprise forwarding the message to a WebSocket server prior to transmitting the message to the network device.

In some embodiments, the message broker is configured to receive additional messages from a plurality of different applications of the cloud-based controller. In some embodiments, the message and the additional messages are all routed to the network device through the WebSocket tunnel. In some embodiments, the message broker includes a plurality of queues, and the message and the additional messages are routed to queues of the message broker based on destination addresses of the message and the additional messages.

In some embodiments, the message is received at a WebSocket client of the network device and then forwarded to a message broker client library of the network device.

In some embodiments, the message broker comprises a fire and forget message broker.

In some embodiments, the acknowledgment is received at the message broker and passed to the application of the cloud-based controller.

In some embodiments, the acknowledgment is received at an ingress controller of the cloud-based controller and passed directly to the application of the cloud-based controller. In some embodiments, the acknowledgment includes an address of the application of the cloud-based controller.

Pursuant to still further embodiments of the present invention, methods for controlling a network device of a wireless communications network are provided in which messages are forwarded from a plurality of services of a cloud-based controller to the network device over a single, persistent hypertext transfer protocol ("HTTP") connection between the cloud-based controller and the network device.

In some embodiments, the messages are forwarded from the services to a message broker of the cloud-based controller prior to being transmitted over the single, persistent HTTP connection between the cloud-based controller and the network device.

In some embodiments, the messages are forwarded from the message broker of the cloud-based controller to a gRPC poxy of the cloud-based controller prior to being transmitted over the single, persistent HTTP connection between the cloud-based controller and the network device.

In some embodiments, the method may further comprise receiving an acknowledgment in response to a first of the messages at the gRPC proxy of the cloud-based controller.

In some embodiments, the method may further comprise forwarding the message to the gRPC proxy for the message broker prior to transmitting the message to the network device.

In some embodiments, the message is forwarded from the cloud-based controller to a gRPC agent of the network device.

In some embodiments, the message broker comprises a fire and forget message broker.

BRIEF DESCRIPTION OF THE DRAWINGS

Like reference numerals refer to corresponding parts throughout the drawings. Moreover, multiple instances of the same part may be designated by a common prefix separated from an instance number by a dash.

DETAILED DESCRIPTION OF THE EMBODIMENTS

A plurality of different software applications typically are present on a network device (e.g., an access point, a switch, etc.) of a WiFi network, and each of these applications may need to communicate with a controller of the WiFi network. In a WiFi network having an on-premise controller, the network devices typically communicate with the controller over secure wired connections that are behind the customer firewall, making communication relatively simple. However, when a cloud-based controller is used, communications typically must be transmitted over public networks and through firewalls, which can be much more complex and challenging.

One way to provide secure communications between a cloud-based controller and a network device of a WiFi network is to establish a secure tunnel such as, for example, a secure shell ("SSH") tunnel, between the cloud-based controller and the network device for each application service running on the cloud-based controller that communicates with the network device. Commands, notifications and other messages generated by the applications services running on the cloud-based controller are transmitted to corresponding applications running on the network device over the appropriate respective SSH tunnels. Unfortunately, this approach may use significant network resources (e.g., ports), requires complex port forwarding rules, and firewalls interposed between the cloud-based controller and the network device may further complicate the implementation. As a result, scaling such a system may be difficult. Thus, establishing separate secure tunnels between each application service and the corresponding applications running on the network device may be less than an ideal solution.

So-called "message brokers" are known in the art which can consolidate communications between one or more applications that are running on a first device and one or more applications that are running on a second device, so that the communications can be exchanged between the first and second devices over a single network connection rather than a plurality of separate connections. A message broker is a software application that performs communications between, for example, a device and a server, by translating the messages from the messaging protocol of the sending device to the messaging protocol of the receiving device. A message broker may include multiple queues, buffers or partitions (referred to herein collectively as "queues"), and the messages may be assigned to the queues based at least in part on the destination address of each message. A message broker may receive messages from multiple sources such as various applications on the sending device (which are often referred to as "producers") and may forward the received messages to multiple destinations such as various applications on the receiving device (which are often referred to as "consumers"). There is at least a one-to-one relationship between a given queue and a given consumer on the receive device. The applications running on the sending device forward each message to the appropriate queues of the message broker, and the message broker then forwards the messages in the queues to the respective applications running on the receiving device. In addition to allowing communication between multiple producers and/or consumers over a single connection, message brokers can provide guaranteed message delivery. In particular, if a message fails to reach a consumer (e.g., because the consumer is offline), the message broker will continue to resend the message until the consumer acknowledges receipt thereof. Examples of commercially available message brokers are Kafka (from the Apache Software Foundation) and MQTT (from mqtt.org).

Unfortunately, most commercially available message brokers are not well-suited for use with cloud-based controllers. For example, many commercially available message brokers employ protocols that open multiple ports at the same time which increases complexity and consumes additional network resources. Message brokers may also lose functionality when operating through firewalls, may require that significant processing and/or memory resources be available on the network devices, and/or may not be readily scalable. For these reasons, existing message broker solutions cannot be readily used for cloud-based controller applications without significant negative effects.

A cloud-based controller for a WiFi network will typically have at least two front end devices for communicating with applications on the controlled network devices. The first device is a hypertext transfer protocol ("HTTP") ingress controller. The HTTP ingress controller forwards communications to the network devices over respective persistent, HTTP-based network connections, and may act as a reverse proxy (i.e., a virtual address) that network devices may forward information to (e.g., commands, data, etc.). The ingress controller can also act as a load balancer that balances the incoming communications/requests from the network devices by distributing the requests across multiple components (e.g., servers) of the cloud-based controller, which improves scalability. Typically, the network devices will have default ports for HTTP and HTTPS communications. As such, it typically is not necessary to configure a customer firewall when an HTTP based message broker is used. This may be a significant advantage favoring use of HTTP-based message brokers. Unfortunately, however, most commercially available message brokers are not HTTP-based, and the ones that are (e.g., Kafka) may be overly complex or lose functionality when operating through customer firewalls.

The second front end device of a cloud-based controller is a layer 3 Internet Protocol ("IP") based load balancer which performs similar functions to the ingress controller with respect to layer 3 IP traffic. However, it may be difficult to use commercially available message brokers with a layer 3 IP based load balancer because end users of the WiFi network are often unwilling to open specific port numbers on their firewall.

Pursuant to embodiments of the present invention, techniques are provided for exchanging messages between a cloud-based controller and the network devices of a wireless communications network (e.g., a WiFi network). These techniques may ensure guaranteed delivery of messages, avoid issues with firewalls that are interposed between the cloud-based controller and the network devices, utilize relatively few network resources, require only limited processing and memory resources on the network devices, and may be highly scalable.

In a first embodiment, the cloud-based controller includes a message broker that may be configured to receive messages from a plurality of different sources (e.g., application services running on the cloud-based controller) and forward those messages to a network device over a single, bidirectional, persistent HTTP connection. The message broker may be a "fire and forget" message broker that does not include any mechanism for determining whether the messages forwarded from the message broker are received at their intended destinations. The cloud-based controller may further include a gRPC proxy (or other RPC proxy) for the message broker. The gRPC proxy may receive messages from the message broker before they are transmitted from the cloud-based controller and may receive acknowledgments from the network device. Thus, the gRPC proxy may ensure that messages from the message broker are reliably delivered. The gRPC proxy may forward messages received from the message broker to an ingress controller of the cloud-based controller that forwards the messages to a network device over a single, persistent HTTP-based connection.

The messages from the cloud-based controller are received by a gRPC agent running on the network device. The gRPC agent (or other RPC agent) acts as an acknowledgment generator, and thus returns an acknowledgment over the HTTP-based connection for each message received, and these acknowledgments are passed to the gRPC proxy on the cloud-based controller (which acts as an acknowledgment receiver) so that confirmation is provided as to the delivery status of each message. The gRPC agent running on the network device forwards the received messages to an embedded message broker running on the network device. The embedded message broker stores each received message in an appropriate queue (e.g., a queue associated with the application to which the message is addressed) and forwards the messages to the appropriate application running on the network device. Messages may similarly be sent from the applications running on the network device to the cloud-based controller in the exact same fashion, with the embedded message broker collecting the messages from the applications and the gRPC agent on the network device forwarding the messages over the persistent HTTP-based tunnel and also acting as an acknowledgment receiver. On the cloud-based controller, the received messages are passed to the gRPC proxy, which acts as an acknowledgment generator (to confirm to the network device that the messages were received) and which forwards the received messages to the message broker on the cloud-based controller for distribution to the application services. The applications running on the cloud-based controller and/or on the network device may optionally provide acknowledgments directly to the applications on the other device with which they communicate via a call-back URL procedure, as will be explained in greater detail herein.

In a second embodiment, the cloud-based controller may again include a fire and forget message broker that may be configured to receive messages from a plurality of different sources (e.g., application services running on the cloud-based controller) and forward those messages to a network device over a single, bidirectional, persistent HTTP connection. In this embodiment, however, the HTTP-based connection may be implemented as a WebSocket tunnel. The message broker may forward messages received from the cloud services to a WebSocket server, and the WebSocket server forwards the messages to an ingress controller of the cloud-based controller for transmission to a WebSocket client provided on the network device.

The WebSocket client receives the messages and forwards them to a message broker client library on the network device. The message broker client library passes the messages to a message handler which forwards the messages to the appropriate applications on the network device. The message broker client library may also generate acknowledgments in response to each message that are transmitted to the cloud-based controller over the WebSocket tunnel, where they are passed back to the cloud services. Messages may likewise be sent from the applications running on the network device to the cloud-based controller in the same fashion, with the message broker client library collecting the messages from the applications and passing them to the WebSocket client for transmission to the cloud-based controller over the WebSocket tunnel. The second embodiment may be appropriate for network devices that may not have sufficient resources to support a gRPC agent.

The techniques for exchanging messages between a cloud-based controller and the network devices of a WiFi network that are disclosed herein use a message broker to simplify having multiple cloud-based services communicate with the network devices while also providing benefits in terms of scalability and load balancing. The embodiments disclosed herein may use persistent bidirectional HTTP connections between the cloud-based controller and each network device, which allows the ingress controller of the cloud-based controller to perform load balancing. Moreover, since a single, persistent, bidirectional HTTP connection is used between the cloud-based controller and each network device, the communication technique may use less network resources than other approaches, and/or may require less resources on each network device. The use of the HTTP connection also makes it easier to operate through firewalls, and may avoid the loss in flexibility that some message brokers experience when operating, for example, through customer firewalls.

Embodiments of the present invention are described in further detail below with reference to the figures.

Figure 1:
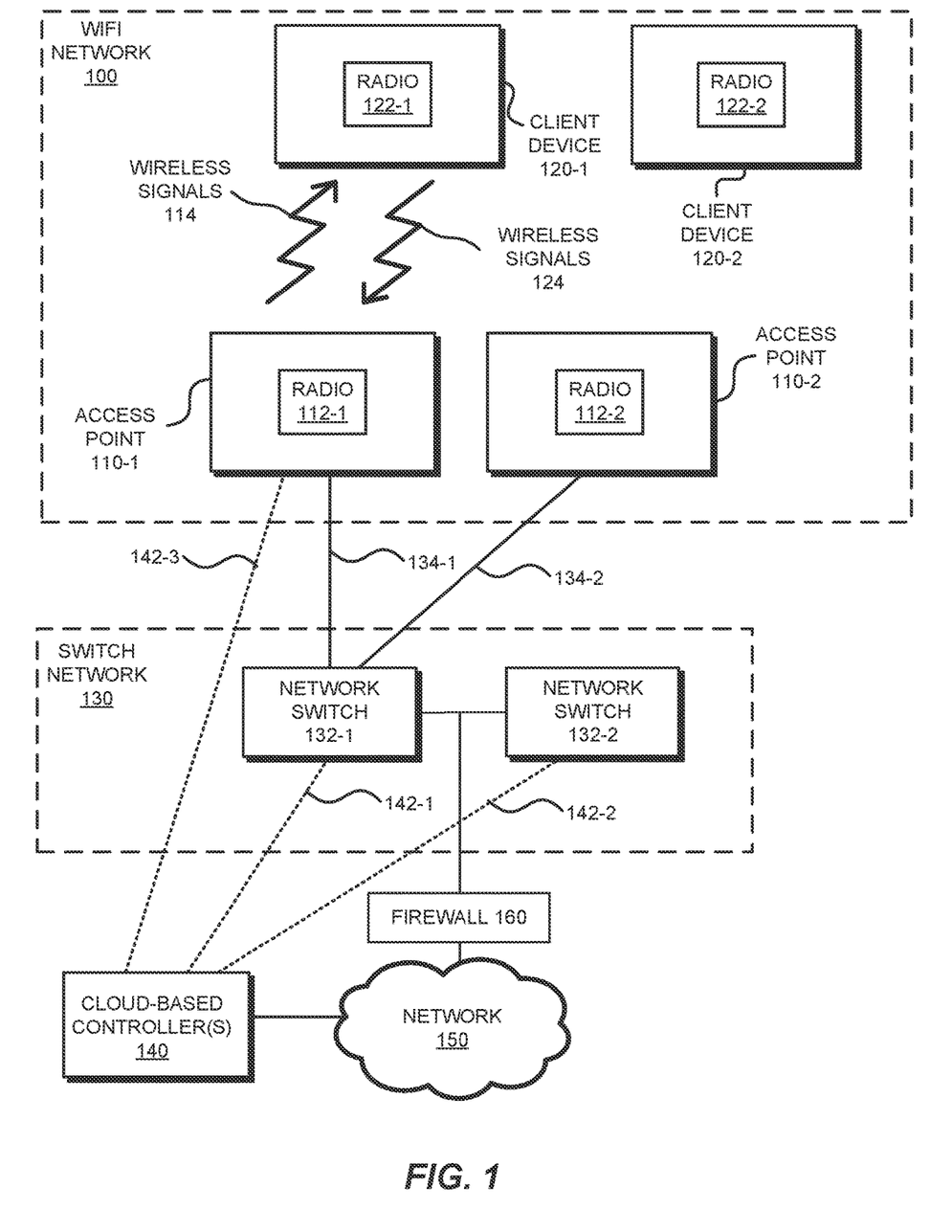
FIG. 1 is a block diagram illustrating an example of a simplified WiFi network in which the communications techniques according to embodiments of the present invention may be practiced.

FIG. 1 is a block diagram illustrating a simplified WiFi network 100 in which the communications techniques according to embodiments of the present invention may be used. As shown in FIG. 1, the WiFi network 100 may include one or more access points 110, one or more client devices 120 (such as cellular telephones, computers, tablets, printers and a wide range of other WiFi-capable electronic devices), and one or more cloud-based controllers 140. Each access point 110 may include one or more radios 112 that operate, for example, in the 2.4 GHz frequency band, the 5 GHz frequency band, and/or the 6 GHz frequency band. The client devices 120 may also include one or more client radios 122 that operate in the 2.4 GHz, 5 GHz and/or 6 GHz frequency bands. Only a single radio 112, 122 is shown in each access point 110 and client device 120 for simplicity, but it will be appreciated that many access points 110 and client devices 120 are capable of operating in multiple different frequency bands.

The access points 110 and the client devices 120 may communicate with each other via wireless communication that is compatible with an IEEE 802.11 standard. For example, a client device (e.g., client device 120-1) may associate with a particular access point (e.g., access point 110-1). The client device 120-1 may communicate with other client devices 120 and/or with external networks 150 via the access point 110-1. In order for a client device 120 to associate with an access point 110, the access point 110 and the client device 120 can transmit advertising frames on wireless channels, detect one another by scanning the wireless channels, exchange data/management frames (such as association requests and responses) to establish a connection and configure security options (e.g., Internet Protocol Security). Once the association is completed, the client device 120 can wirelessly communicate over the WiFi network 100 by transmitting and receiving frames or packets via the wireless connection to the access point 110. The wireless signals 114 that are transmitted from the access points 110 to the client devices 120 and the wireless signals 124 that are transmitted from the client devices 120 to the access points 110 are illustrated in FIG. 1 via jagged lines.

WiFi network 100 may further include a switch network 130 that includes one or more network switches and/or routers 132. As an example, a network switch 132-1 may include a number of communication interfaces or ports (not shown) that are connected to various of the network devices. During operation, a first of the communication interfaces may receive a packet or other data container from a first electronic device (e.g., a client device 120, an access point 110, another network switch 132, etc.). The packet may then be processed and forwarded to a second port associated with a second electronic device. The network switch and/or router 132 may be a layer-2 or layer-3 network switch or router. The switch network 130, and the network switches 132 thereof, may be coupled to access points 110 of the wireless network 102 via wired links 134.

The access points 110 and the switches/routers 132 may be connected to an external network 150. The network 150 may comprise, for example, the Internet, an intra-net and/or one or more dedicated communication links. The network 150 may be separated from the switch network 130 and the access points 110 by a firewall 160, which may monitor network traffic that is incoming to and outgoing from the switch network 130 and decide whether to permit or prohibit various traffic based on one or more security rules. The access points 110 may provide the client devices 120 access to the network 150. It will be appreciated that some access points 110 may only be connected to the network 150 through other access points 110 (e.g., in a mesh network implementation).

The WiFi network 100 further includes one or more cloud-based controllers 140 that are deployed at one or more locations that may be relatively remote from the access points 110 and/or the switch network 130. The cloud-based controllers 140 may communicate with the network switches 132 and the access points 110 via, for example, the network 150. The cloud-based controllers 140 may perform configuration operations and/or management operations that control functionality of the network devices of the WiFi network 100 such as the access points 110 and the switches and routers 132. For example, the cloud-based controllers 140 may define flow definitions comprising packet processing rules and corresponding actions and promulgate these rules to the network switches 132 of the switch network 130. As another example, the cloud-based controllers 140 may manage the access points 110, for example by providing various configuration information, controlling settings, routing information, collecting statistics, providing authorization/ authentication information and the like. The cloud-based controller 140 may communicate with the access point 110 and/or network switches 132 via one or more logical links 142, which in some embodiments may at least partially overlap the wired links 134.

As described in further detail below with reference to FIG. 7, the access points 110, client devices 120 and/or the cloud-based controllers 140 may include subsystems, such as a networking subsystem, a memory subsystem and a processor subsystem.

Figure 2:
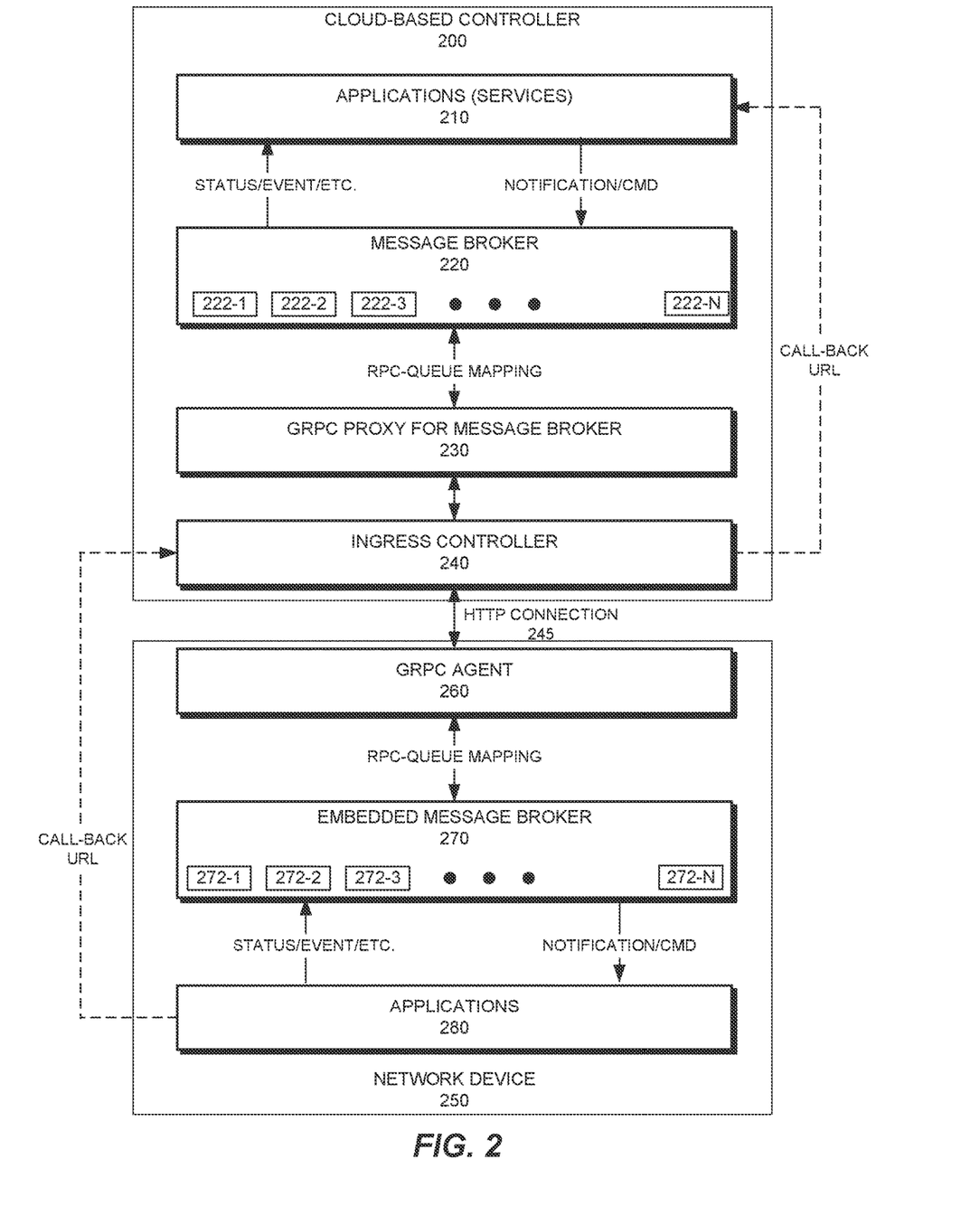
FIG. 2 is a block diagram illustrating an architecture for exchanging messages between a cloud-based controller and a network device according to certain embodiments of the present invention.

FIG. 2 is a block diagram illustrating an architecture for exchanging messages between a cloud-based controller 200 and a network device 250 according to certain embodiments of the present invention.

As shown in FIG. 2, a cloud-based controller 200 includes a plurality of application services 210, a message broker 220, a gRPC proxy 230 and an ingress controller 240. The services 210 may comprise a plurality of applications running on the cloud-based controller 200 that communicate with the network device 250. The network device 250 is a device that is part of a wireless communications network (e.g., WiFi network 100 of FIG. 1). The network device 250 may comprise, for example, an access point, a switch, a data plane, a router or the like. The network device 250 includes a gRPC agent 260, an embedded message broker 270, and a plurality of applications 280 that run on the network device 250 that communicate with the cloud-based controller 200. While only a single network device 250 is shown in FIG. 2 for simplicity, it will be appreciated that the cloud-based controller 200 may be in communication with a large number of different network devices 250.

As shown in FIG. 2, the services 210 running on the cloud-based controller 200 may need to send notifications, commands or the like to the network device 250. Messages comprising such notifications and/or commands are passed from the various services 210 to the message broker 220. Herein, references to "messages" refer to the information that is exchanged between the application services 210 of the cloud-based controller 200 and the applications 280 of the network device 250. These messages may comprise at least part of a "payload" of one or more larger transmissions that are used to pass the messages between the application services 210 of the cloud-based controller 200 and the applications 280 of the network device 250 through one or more intermediate elements. As is further shown in FIG. 2, the message broker 220 may include a plurality of queues 222. The messages forwarded by the services 210 may, for example, be directed to particular queues 222 based on the intended recipient(s) of the message(s). The message broker 220 may, for example, comprise software that translates a message from a messaging protocol of the sender (e.g., one of the services 210) to the messaging protocol of the intended recipient (e.g., one of the applications 280 on the network device 250). The message broker 220 takes the messages received from the plurality of different services 210 and outputs these messages to the gRPC proxy 230. The gRPC proxy 230 may comprise a software application that allows an application or device to communicate with an application running on an external device as if the external application were a local object.

In addition, the gRPC proxy 230 may operate as an acknowledgment receiver to ensure that messages sent from the cloud-based controller 200 are received by the network device 250. The message broker 220 may thus guarantee reliable delivery.

The gRPC proxy 230 may forward each message received from the message broker 220 to the ingress controller 240. The ingress controller 240 establishes a single, bidirectional, persistent HTTP-based connection 245 with the network device 250. The network device 250 may have default ports for HTTP and HTTPS traffic and hence by using an HTTP connection 245 between the cloud-based controller 200 and the network device 250 the need to configure a firewall that may be positioned between the cloud-based controller 200 and the network device 250 (e.g., a firewall of the organization deploying the WiFi network that the network device 250 is part of) may be eliminated. The need for opening additional ports for the connection may also be eliminated. Thus, by providing a gRPC-over-HTTP connection between the cloud-based controller 200 and the network device 250, the number of network resources consumed and the complexity of the connection can be reduced. This acts to improve scalability.

Still referring to FIG. 2, messages forwarded by the ingress controller 240 over the HTTP connection 245 are received at the gRPC agent 260 of the network device 250. The gRPC agent 260 is a counterpart to the gRPC proxy 230 that allows the network device 250 to appear as a local object to the cloud-based controller 200. The gRPC agent 260 also generates acknowledgments in response to each received message, and the acknowledgments are forwarded back to the ingress controller 240 of the cloud-based controller 200 over the HTTP connection 245. The ingress controller 240 forwards the acknowledgments to the gRPC proxy 230. If an acknowledgment is not received for a particular message within a specified time period, the gRPC proxy 230 may resend the message to guarantee that the messages received from the message broker 220 are all properly delivered to the network device 250. The gRPC agent 260 on the network device 250 forwards each received message to the embedded message broker 270, and each message is mapped to an appropriate queue 272 based on the particular application 280 the message is addressed to. The embedded message broker 270 then passes each received message from the queues 272 to the appropriate applications 280.

The applications 280 may also generate messages that are passed to the cloud-based controller 200, such as data, status messages, event notifications and the like. These messages are passed from the applications 280 to the embedded message broker 270, where they are routed to appropriate queues 272 within the message broker 270 based on the intended recipients (e.g., the different services 210 on the cloud-based controller 200) of the messages. The embedded message broker 270 forwards these messages to the gRPC agent 260. The gRPC agent 260 transmits the messages over the single, persistent, bidirectional HTTP connection 245 to the ingress controller 240 of the cloud-based controller 200. The ingress controller 240 may perform load balancing with respect to messages received from network device 250 (and from other devices communicating with the services 210), and thus may facilitate scalability for the cloud-based controller 200. The ingress controller 240 passes the received messages to the gRPC proxy 230, which forwards the messages to the message broker 220 where they are routed to appropriate queues 222. The gRPC proxy 230 also generates an acknowledgment for each received message that is passed to the ingress controller 240 for transmission to the gRPC agent 260 of the network device 250 over the HTTP connection 245. The message broker 220 then passes the messages from the network device 250 to the appropriate services 210. The messages may be routed to the appropriate services 210 based on uniform resource locators ("URLs") for the different services 210 that are included in the messages.

As is further shown in FIG. 2, a so-called "callback URL" may be used as an alternative (or additional) technique for each service 210 to confirm that messages it sends to the network device 250 have in fact been received by the network device 250. The callback URL is an object that is embedded in a message sent by one of the services 210 that includes the URL for the particular service 210. When the application 280 to which the message is addressed reads the message, an application programming interface may generate, for example, both an acknowledgment and a result of execution of the command or other request that are routed to the ingress controller 240 via a separate path (e.g., through a path/ap/callback/traceroute/{app serial number}). The acknowledgment includes the URL for the service 210 that sent the original message, and the ingress controller 240 routes the acknowledgment to the service 210. The callback URL may be used, for example, with respect to messages having lower importance. For example, an access point might acknowledge a command from the cloud-based controller 200 instructing the access point to illuminate an LED thereof via a call-back URL acknowledgment. For more important commands (e.g., commands relating to troubleshooting), the acknowledgments may be sent through the above-described primary path for acknowledgments.

Figure 3A:
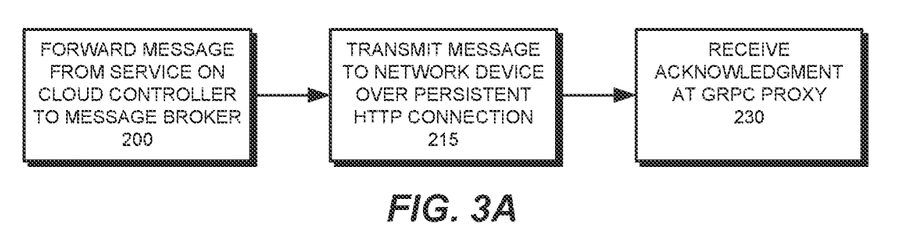
FIG. 3A is a flow chart diagram illustrating a method for a cloud-based controller to communicate with a network device of a wireless communications network according to embodiments of the present invention.

FIG. 3A is a flow chart diagram illustrating a method for a cloud-based controller to communicate with a network device of a wireless communications network. As shown in FIG. 3A, operations may begin with an application service of the cloud-based controller forwarding a message to a message broker of the cloud-based controller (operation 200). The message may thereafter be transmitted from the cloud-based controller to the network device over a persistent HTTP connection (operation 215). Thereafter, a gRPC proxy of the cloud-based controller may receive an acknowledgment that the message was received at the network device (operation 230).

Figure 3B:
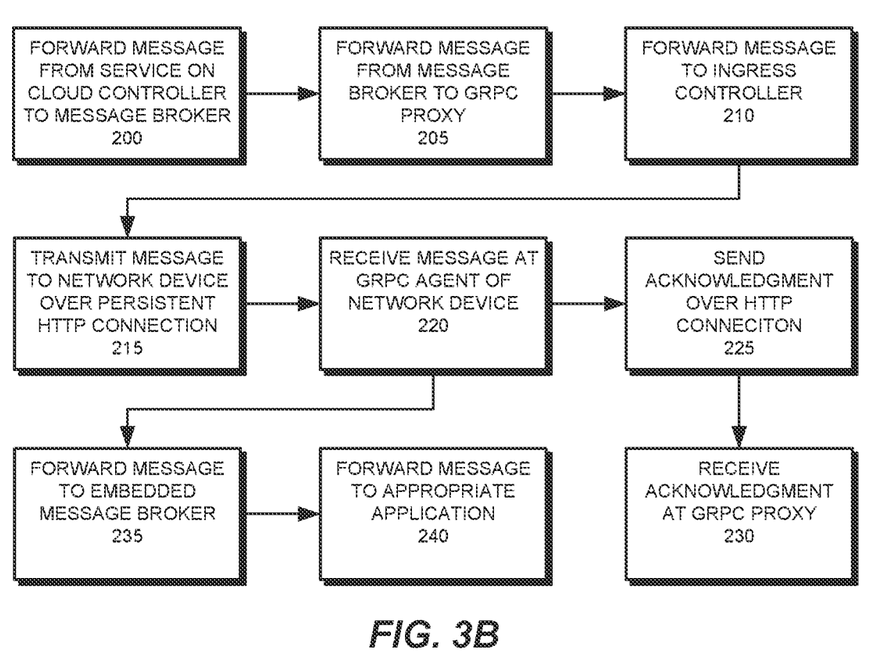
FIG. 3B is a flow chart diagram illustrating details of an example implementation of the method of FIG. 3A.

FIG. 3B is a flow chart diagram illustrating further details of one possible implementation of the method of FIG. 3A. As shown in FIG. 3B, operations may again begin with an application service of the cloud-based controller forwarding a message to a message broker for the cloud-based controller (operation 200). The message may be stored in a queue within the message broker. The message broker may appropriately reformat the message and then forward the reformatted message to a gRPC proxy of the cloud-based controller (operation 205). The gRPC proxy may, in turn, forward the reformatted message to an ingress controller of the cloud-based controller (operation 210). Then, as discussed above with respect to FIG. 3A, the ingress controller may transmit the message to the network device over a persistent HTTP connection between the cloud-based controller and the network device (operation 215).

The gRPC agent of the network device may receive the message (operation 220). In response, the gRPC agent may generate an acknowledgment message that is forwarded over the persistent HTTP connection to the ingress controller of the cloud-based controller (operation 225). The ingress controller passes the acknowledgment to the gRPC proxy (operation 230). The gRPC proxy may then discard the original message (since it now knows that the message was received). As is further shown in FIG. 3B, in response to receiving the message, the gRPC agent (in addition to generating the acknowledgment) may pass the message to the embedded message broker, where the message is routed to an appropriate queue (operation 235). The embedded message broker may then forward the message to the appropriate application (operation 240).

Figure 4A:
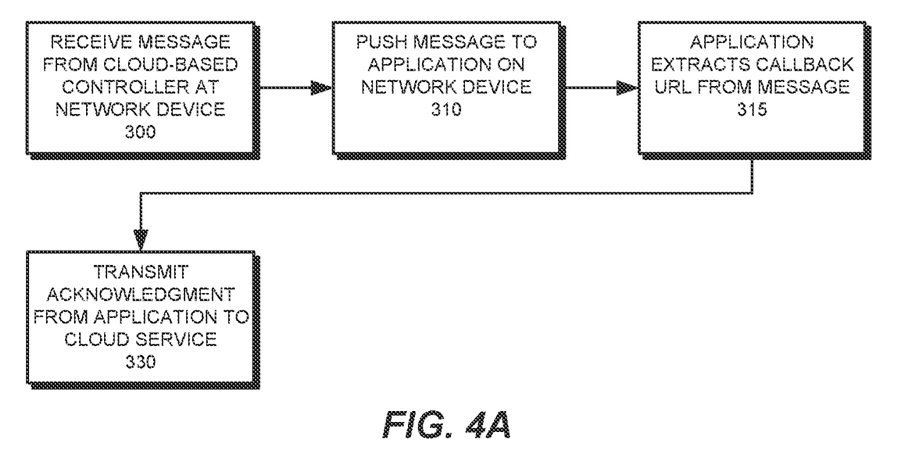
FIG. 4A is a flow chart diagram illustrating a method for a network device of a wireless communications network to communicate with a cloud-based controller according to further embodiments of the present invention.

FIG. 4A is a flow chart diagram illustrating a method for a network device of a wireless communications network to communicate with a cloud-based controller according to further embodiments of the present invention. As shown in FIG. 4A, a message generated by an application service of the cloud-based controller is received at the network device (operation 300). The message is passed to an application that is installed on the network device based on an address contained in the message (operation 310). The application then extracts a callback URL from the message (operation 315). The application may then transmit an acknowledgment addressed to a service running on the cloud-based controller in response to receiving the message (operation 330). The acknowledgment may be transmitted to the ingress controller of the cloud-based controller, and the ingress controller may forward the acknowledgment directly to the application service that sent the original message based on a URL contained within the acknowledgment. This acknowledgment is not received at the message broker.

Figure 4B:
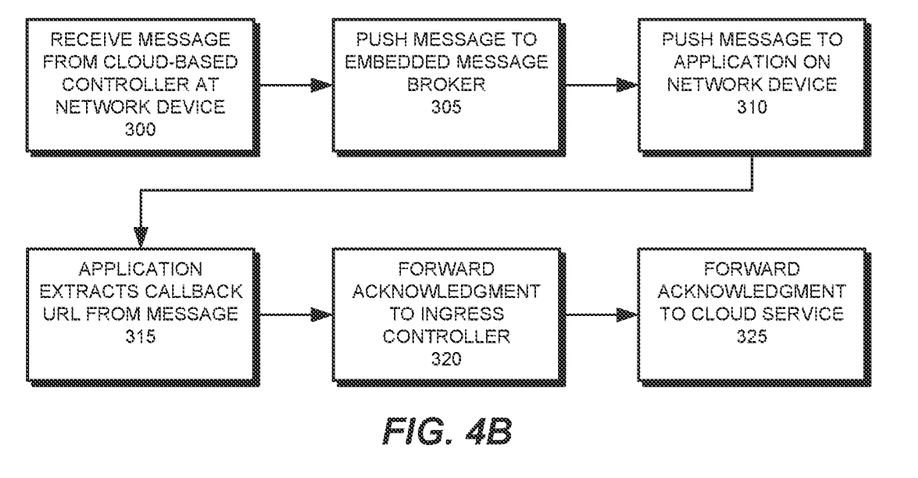
FIG. 4B is a flow chart diagram illustrating details of an example implementation of the method of FIG. 4A.

FIG. 4B is a flow chart diagram illustrating more details of an example implementation of the method of FIG. 4A. As shown in FIG. 4B, a message generated by an application service of the cloud-based controller is received at the network device (operation 300). The message may be received at a gRPC agent of the network device and may be generated and forwarded to the gRPC agent in the manner discussed above with reference to operations 200, 205, 210, 215 and 220 of FIG. 3B. The message may then be pushed from the gRPC agent to an embedded message broker of the network device (operation 305). The message is passed to an application that is installed on the network device based on an address contained in the message (operation 310).

The application extracts a callback URL from the message (operation 315). The application may then transmit an acknowledgment addressed to a service running on the cloud-based controller to the ingress controller of the cloud-based controller (operation 320). The acknowledgment may be transmitted, for example, over a path/ap/callback/traceroute/{app serial number}. The ingress controller may then forward the acknowledgment directly to the application service that sent the original message based on a URL contained within the acknowledgment (operation 325).

Some network devices may only have limited memory and/or processing capabilities. These devices may not have sufficient resources to run gRPC and/or an embedded message broker. For example, some inexpensive access points may have limited memory. With these devices, there may not be sufficient resources to communicate with a cloud-based controller using the techniques discussed above with reference to FIGS. 2-4B.

Figure 5:
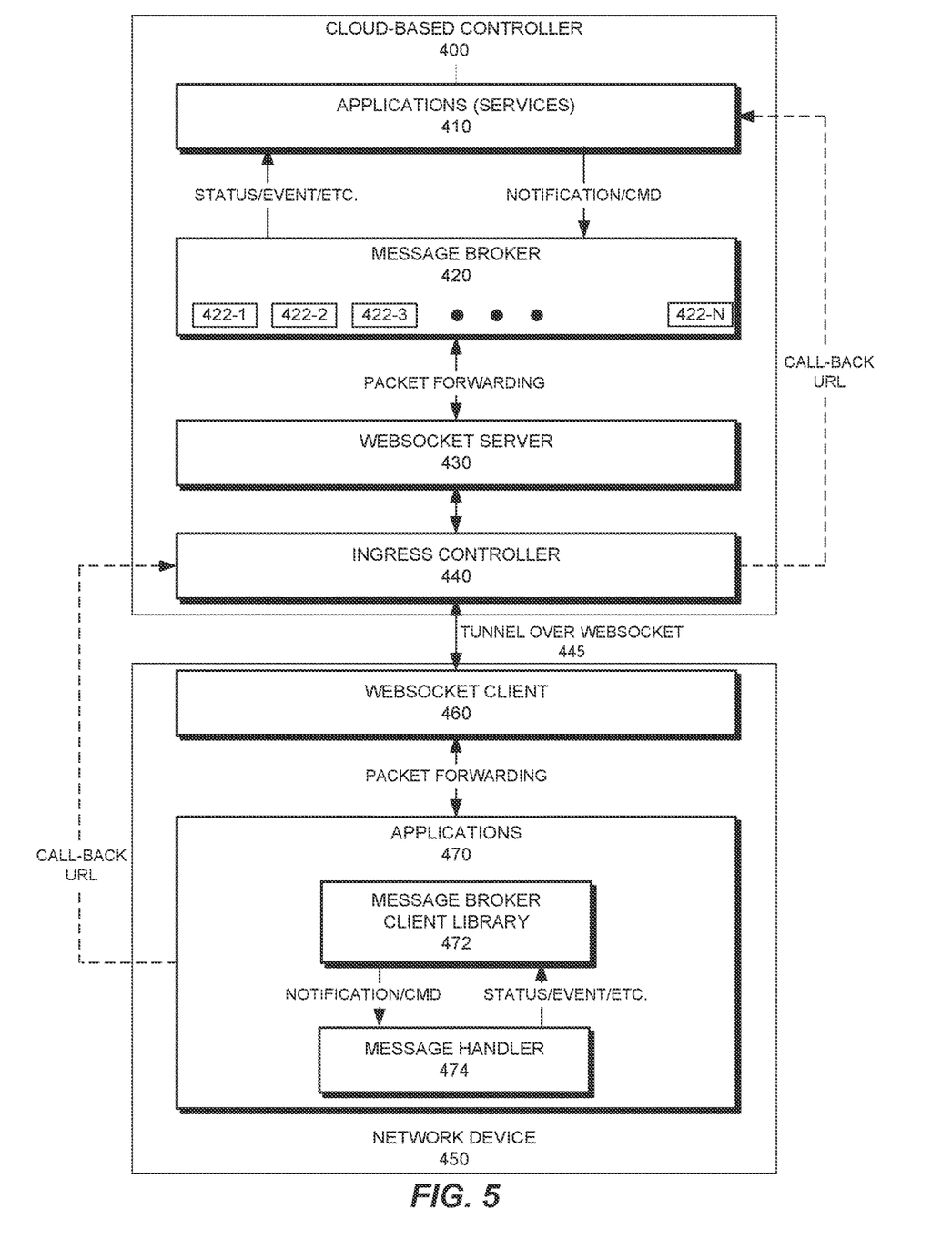
FIG. 5 is a block diagram illustrating an architecture for exchanging messages between a cloud-based controller and a network device of a wireless communications network according to further embodiments of the present invention.

FIG. 5 is a block diagram illustrating an architecture for exchanging messages between a cloud-based controller 400 and a network device 450 according to further embodiments of the present invention. The architecture shown in FIG. 5 may require less resources within the network device 450 as compared to the architecture shown in FIG. 2.

As shown in FIG. 5, the cloud-based controller 400 includes a plurality of services 410, a message broker 420, a WebSocket server 430 and an ingress controller 440. The services 410 may comprise a plurality of applications running on the cloud-based controller 400 that communicate with the network device 450. The network device 450 is a device that is part of the wireless communications (e.g., WiFi) network such as access point, a switch, a data plane, a router or the like. The network device 450 includes a WebSocket client 460 and a plurality of applications 470 that run on the network device 450 that communicate with the cloud-based controller 400.

As shown in FIG. 5, the application services 410 running on the cloud-based controller 400 may need to send notifications, commands and/or other information to the network device 450. Messages containing such notifications and/or commands are passed from the various services 410 to the message broker 420, where the messages are stored in queues 422 based on the intended recipients of the messages. The message broker 420 may, for example, be identical to the message broker 220 discussed above with reference to FIG. 2. The message broker 420 passes the received messages to the WebSocket server 430. The WebSocket server 430 may comprise a server that acts as a middleman to securely route communications through firewalls using secure socket layer ("SSL") certificates. WebSocket is also HTTP-based and hence this approach again allows communications between the application services 410 of the cloud-based controller 400 and applications 470 running on a network device 450 to be routed over a single, persistent, bidirectional HTTP-based connection. The WebSocket server 430 forwards the messages to the ingress controller 440 for transmission over the WebSocket tunnel 445 that is formed between the cloud-based controller 400 and the network device 450.

The WebSocket client 460 on network device 450 is at the other end of the WebSocket tunnel 445 and receives the messages from the cloud-based controller 400. The applications 470 included on the client device 450 include a message broker client library 472. The messages are passed from the WebSocket client 460 to the message broker client library 472. The message broker client library 472 may be a counterpart to message broker 420. The payload in the transmission over the WebSocket tunnel is or includes the original message generated by the application service 410 running on the cloud-based controller 400. The WebSocket client 460 can extract the payload (including the message) and forward it to the message broker client library 472 as shown by the heading "packet forwarding" in FIG. 5. Upon receipt of a message, the message broker client library 472 generates an acknowledgment which is passed to the WebSocket client 460 and transmitted back to the message broker through the WebSocket tunnel 445, ingress controller 440 and WebSocket server 430. The message broker 410 may then forward the acknowledgment to the service 410 that generated the original message. If an acknowledgment is not received for a particular message within a specified time period, the service 410 that generated the original message may resend the message to guarantee that the message is properly delivered to the network device 250. Since the message broker client library 472 provides acknowledgments, the message broker 420 may be implemented as a simple "fire and forget" message broker. The message broker client library 472 may then pass the message to a message handler 474. It will be understood that both the message broker client library 472 and the message handler 474 are part of an application 470. The message handler 474 is a component of the application 470 that executes the message (e.g., responds to the message). For example, if the message is a "trace route" command, the message handler can execute that command and return the result to an application service 410 running on the cloud-based controller 400 via, for example, a callback URL.

The applications 470 running of the network device 450 may also generate messages that are passed to the cloud-based controller 400, such as data, status messages, event notifications and the like. These messages are passed from the applications 470 to the message handler 474, where they are routed to the message broker client library 472. The message broker client library 472 forwards these messages to the WebSocket client 460. The WebSocket client 460 transmits the messages over the WebSocket tunnel 445 to the ingress controller 440 of the cloud-based controller 400. The ingress controller 440 may perform load balancing with respect to messages received from network device 450 (and from other devices communicating with the services 410), and thus may facilitate scalability for the cloud-based controller 400. The ingress controller 440 passes the received messages to the WebSocket server 430, which forwards the messages to the message broker 420 where they are routed to appropriate queues 422. The message broker 420 then passes the messages from the network device 450 to the appropriate services 410. For return messages there may be no acknowledgments.

As is further shown in FIG. 5, an optional "callback URL" may be used as an alternative (or additional) technique for each service 410 to confirm that messages it sends to the network device 450 have in fact been received by the network device 450. The callback URL may be implemented in the same manner as discussed above with reference to FIG. 2, and hence further description thereof will be omitted here.

Figure 6A:
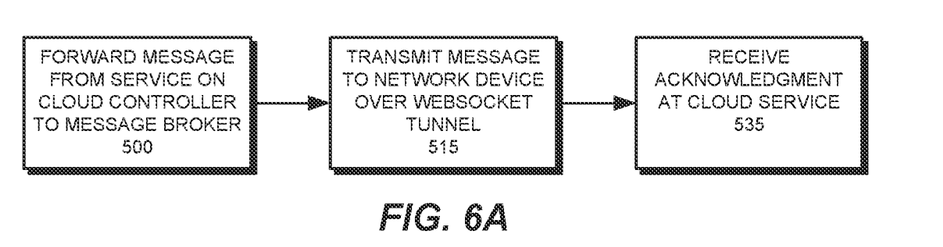
FIG. 6A is a flow chart diagram illustrating methods for a cloud-based controller to communicate with a network device of a wireless communications network according to embodiments of the present invention.

FIG. 6A is a flow chart diagram illustrating a method for a cloud-based controller to communicate with a network device of a wireless communications network according to embodiments of the present invention. As shown in FIG. 6A, operations may begin with an application service of the cloud-based controller forwarding a message to a message broker for the cloud-based controller (operation 500). The message may thereafter be transmitted from the cloud-based controller to the network device over a WebSocket tunnel (operation 515). Thereafter, an acknowledgment may be received at the application service of the cloud-based controller acknowledging that the message was received at the network device (operation 540).

Figure 6B:
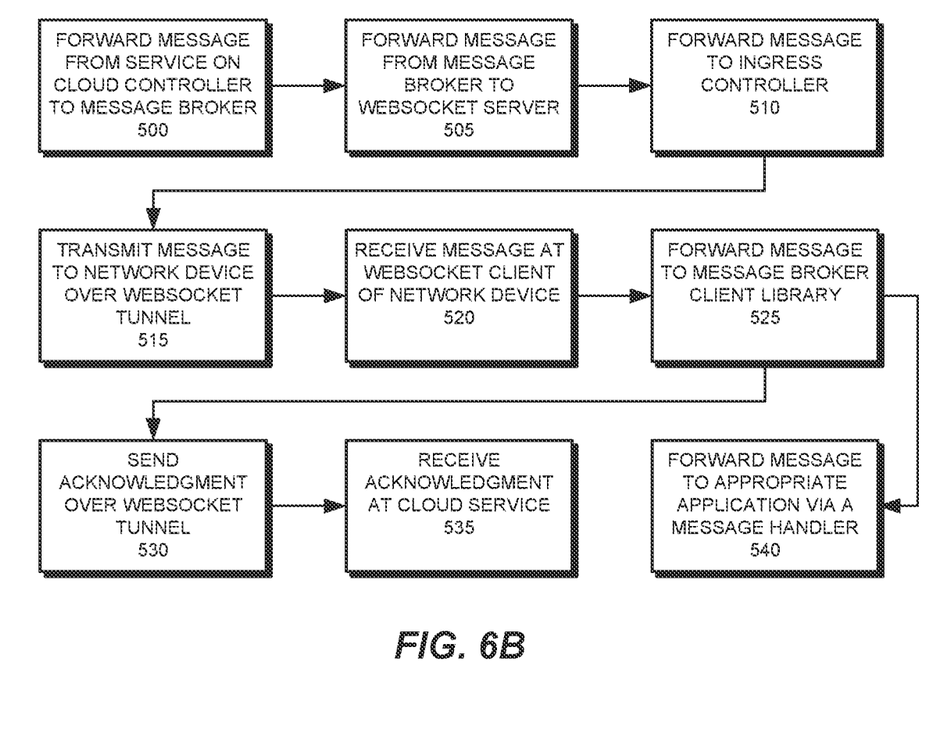
FIG. 6B is a flow chart diagram illustrating details of an example implementation of the method of FIG. 6A.

FIG. 6B is a flow chart diagram illustrating further details of one possible implementation of the method of FIG. 6A. As shown in FIG. 6B, operations may again begin with an application service of the cloud-based controller forwarding a message to a message broker for the cloud-based controller (operation 500). The message may be stored in a queue within the message broker. The message broker may appropriately reformat the message and then forward the reformatted message to a WebSocket server of the cloud-based controller (operation 505). The WebSocket server may, in turn, forward the reformatted message to an ingress controller of the cloud-based controller (operation 510). The ingress controller may transmit the message to the network device over a WebSocket tunnel between the cloud-based controller and the network device (operation 515).

A WebSocket client of the network device may receive the message (operation 520). The WebSocket client may pass the message to a message broker client library, which is an application running on the network device (operation 525). The message broker client library may generate an acknowledgment message that is forwarded over the WebSocket tunnel to the ingress controller of the cloud-based controller (operation 530). The ingress controller passes the acknowledgment to the application service of the cloud-based controller that sent the message via the WebSocket tunnel and the message broker of the cloud-based controller (operation 535). The message broker client library may also route the message to the appropriate application of the network device (operation 540).

Figure 7:
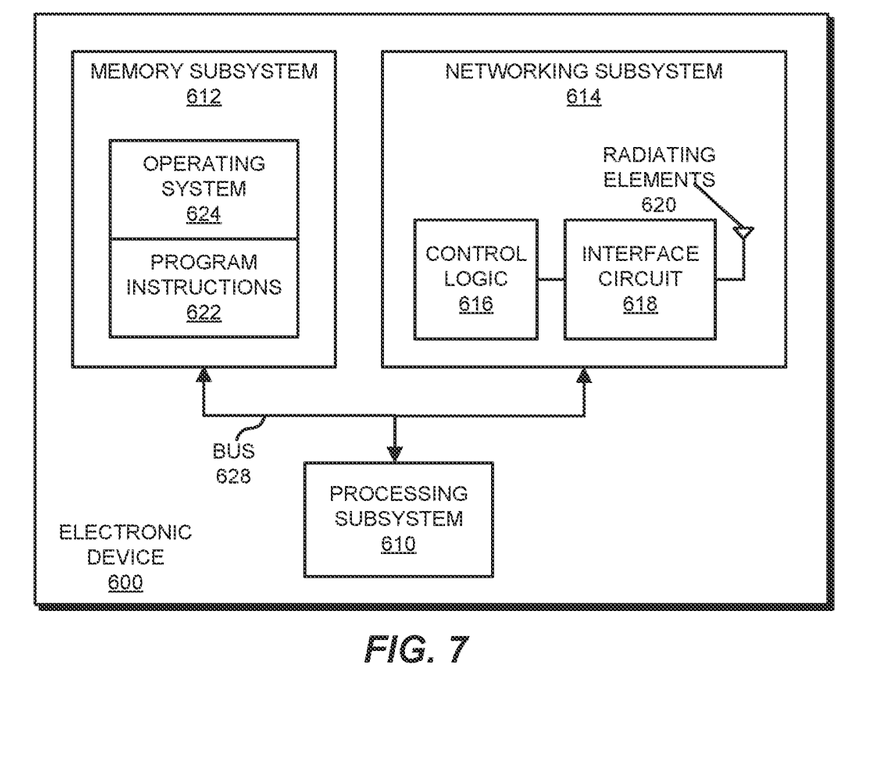
FIG. 7 is a block diagram of an electronic device according to embodiments of the present invention.

FIG. 7 is a block diagram illustrating an electronic device 600 in accordance with some embodiments. The electronic device may comprise, for example, a client device, an access point or a controller. The electronic device 600 includes a processing subsystem 610, a memory subsystem 612, and a networking subsystem 614. Processing subsystem 610 includes one or more circuit elements that are configured to perform computational operations. Memory subsystem 612 includes one or more circuit elements for storing data and/or instructions. In some embodiments, the instructions may include an operating system and one or more program modules which may be executed by processing subsystem 610.

Networking subsystem 614 includes one or more circuit elements that are configured to couple to and communicate on a wired and/or wireless network (i.e., to perform network operations), including: control logic 616, an interface circuit 618 and one or more radiating elements 620. Thus, electronic device 600 may or may not include the one or more radiating elements 620. Networking subsystem 614 includes at least a networking system based on the standards described in IEEE 802.11 (e.g., a Wi-Fi networking system).

Networking subsystem 614 includes processors, controllers, radios/radiating elements, sockets/plugs, and/or other devices used for coupling to, communicating on, and handling data and events for each supported networking system. Note that mechanisms used for coupling to, communicating on, and handling data and events on the network for each network system are sometimes collectively referred to as a "network interface" for the network system. Electronic device 600 may use the mechanisms in networking subsystem 614 for performing simple wireless communication, e.g., transmitting frames and/or scanning for frames transmitted by other electronic devices.

Processing subsystem 610, memory subsystem 612, and networking subsystem 614 are coupled together using bus 628. Bus 628 may include an electrical, optical, and/or electro-optical connection that the subsystems can use to communicate commands and data among one another.

The operations performed in the communication techniques according to embodiments of the present invention may be implemented in hardware or software, and in a wide variety of configurations and architectures. For example, at least some of the operations in the communication techniques may be implemented using program instructions 622, operating system 624 (such as a driver for interface circuit 618) or in firmware in interface circuit 618. Alternatively or additionally, at least some of the operations in the communication techniques may be implemented in a physical layer, such as hardware in interface circuit 618.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

What is claimed is:

1. A method for a cloud-based controller to communicate with a network device of a wireless communications network, the method comprising:
   forwarding a message from an application of the cloud-based controller to a message broker of the cloud-based controller;
   translating the message into a translated message suitable for transmission to the network device;
   transmitting, from the cloud-based controller, the translated message to the network device over a persistent hypertext transfer protocol ("HTTP") connection; and
   receiving an acknowledgment in response to transmitting the translated message at a gRPC proxy for the message broker, wherein the cloud-based controller comprises the gRPC proxy,
   wherein the message broker is configured to receive additional messages from a plurality of different applications of the cloud-based controller, and
   wherein the message broker includes a plurality of queues, and the message and the additional messages are routed to queues of the message broker based on destination addresses of the message and the additional messages.

2. The method of claim 1, further comprising forwarding the message to the gRPC proxy for the message broker prior to transmitting the translated message to the network device.

3. The method of claim 1, wherein the message and the additional messages are all routed to the network device through the persistent HTTP connection.

4. The method of claim 1, wherein the message is received at a gRPC agent of the network device.

5. The method of claim 1, wherein the message broker comprises a fire and forget message broker.

6. The method of claim 1, wherein the message is a first message from the application of the cloud-based controller, the method further comprising:
   forwarding a second message from the application of the cloud-based controller to the message broker;
   transmitting the second message to the network device over the persistent HTTP connection; and
   receiving a second acknowledgment to the second message at an ingress controller of the cloud-based controller, the second acknowledgment including an address of the application.

7. The method of claim 6, wherein the second acknowledgment is not routed to the application through the message broker.

8. A method of controlling a network device of a wireless communications network, the method comprising:
   forwarding messages from a plurality of services of a cloud-based controller to the network device over a single, persistent hypertext transfer protocol ("HTTP") connection between the cloud-based controller and the network device,
   wherein a message broker of the cloud-based controller includes a plurality of queues, and the messages are routed to the queues of the message broker based on destination addresses of the messages, prior to forwarding to the network device.

9. The method of claim 8, wherein the messages are forwarded from the services to the message broker of the cloud-based controller prior to being transmitted over the single, persistent HTTP connection between the cloud-based controller and the network device.

10. The method of claim 9, wherein the messages are forwarded from the message broker of the cloud-based controller to a gRPC proxy of the cloud-based controller prior to being transmitted over the single, persistent HTTP connection between the cloud-based controller and the network device.

11. The method of claim 10, further comprising receiving an acknowledgment in response to a first of the messages at the gRPC proxy of the cloud-based controller.

12. The method of claim 11, further comprising forwarding the first of the messages to the gRPC proxy for the message broker prior to transmitting the first of the messages to the network device.

13. The method of claim 9, wherein the message broker comprises a fire and forget message broker.

* * * * *